3 Sheets—Sheet 1.

D. THOMAS.
Cupola-Furnace, and Process of Working Iron.

No. 202,605. Patented April 16, 1878.

ATTEST:
Saml. S. Boyd
Paul Bakewell

INVENTOR,
David Thomas,
by Chas. D. Moody,
atty:

3 Sheets—Sheet 3.

D. THOMAS.
Cupola-Furnace, and Process of Working Iron.

No. 202,605.  Patented April 16, 1878.

ATTEST,
Saml. S. Boyd
Paul Bakewell

INVENTOR.
David Thomas,
by Chas. D. Moody,
atty.

UNITED STATES PATENT OFFICE.

DAVID THOMAS, OF ST. LOUIS, ASSIGNOR OF SIX-TENTHS HIS RIGHT TO WILLIAM L. REYNOLDS AND FREDERICK W. E. BEST, OF SAME PLACE, AND CHAS. D. MOODY, OF ST. LOUIS COUNTY, MISSOURI.

IMPROVEMENT IN CUPOLA-FURNACES AND PROCESSES OF WORKING IRON.

Specification forming part of Letters Patent No. 202,605, dated April 16, 1878; application filed June 14, 1877.

*To all whom it may concern:*

Be it known that I, DAVID THOMAS, a resident of St. Louis, Missouri, have made a new and useful Improvement in the Manufacture of Steel and Iron, of which the following is a full, clear, and exact description, reference being had to the annexed drawing, making part of this specification, in which—

Figure 1:
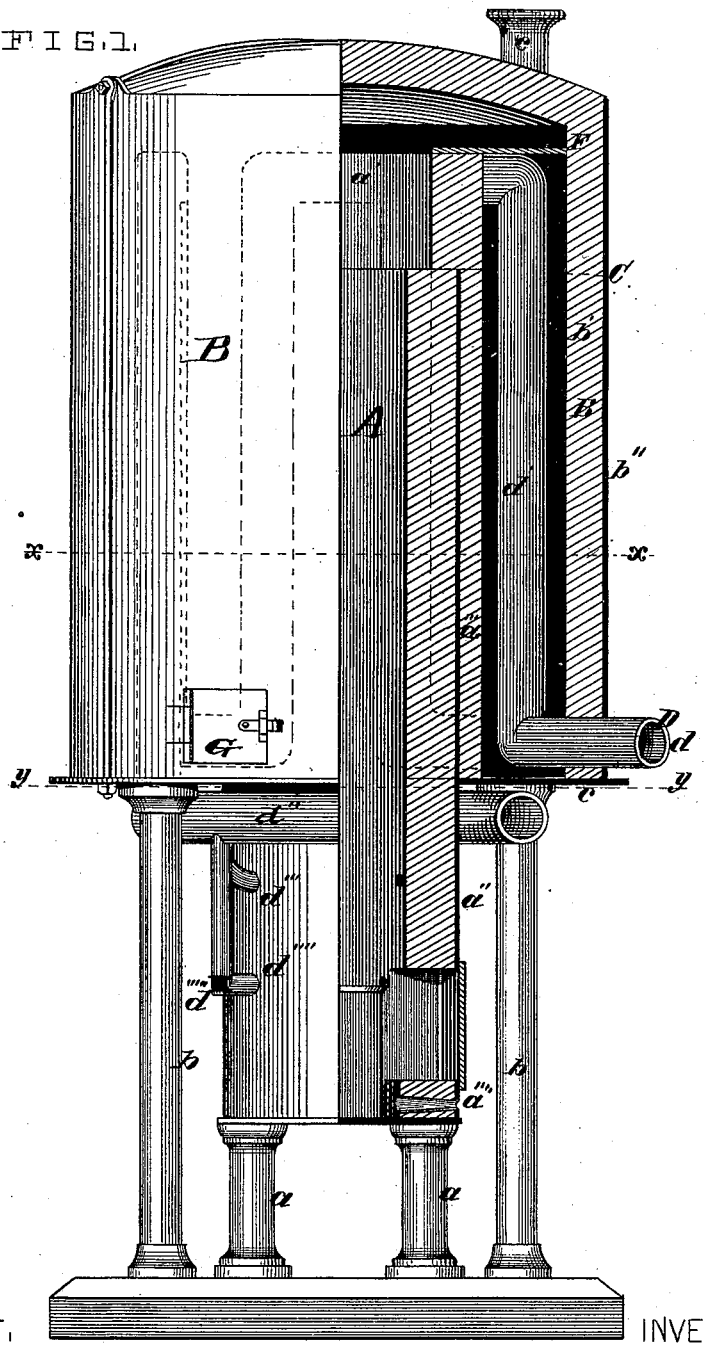
Figure 2:
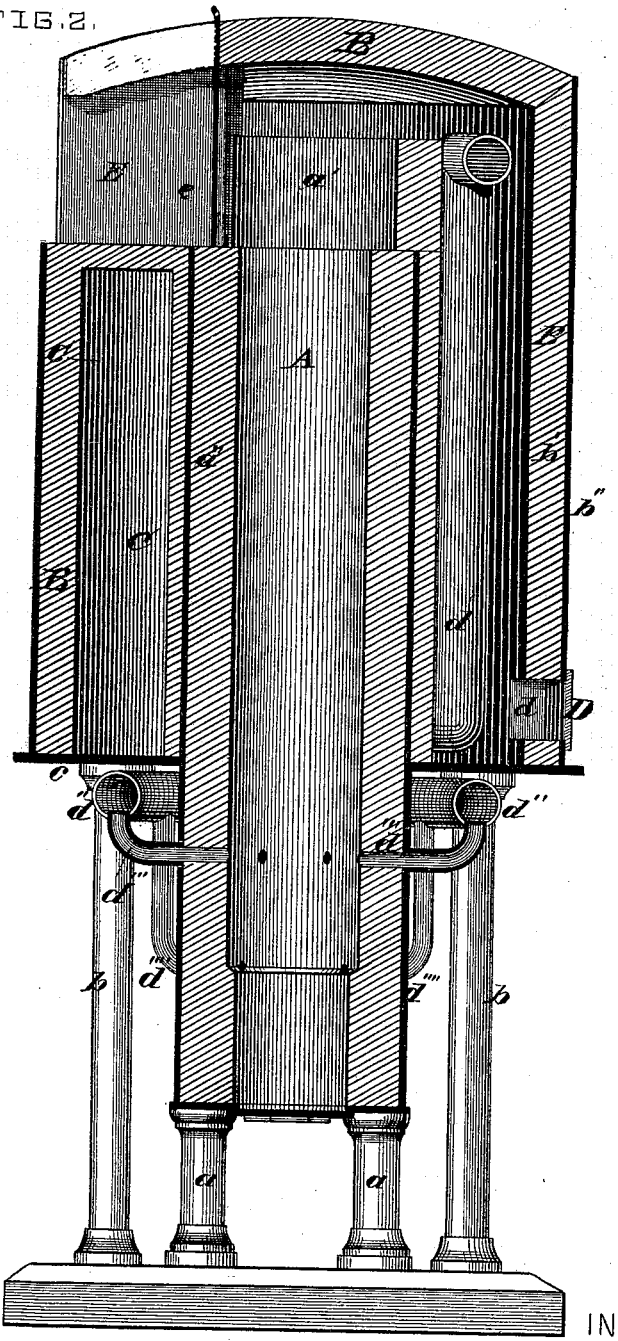
Figure 3:
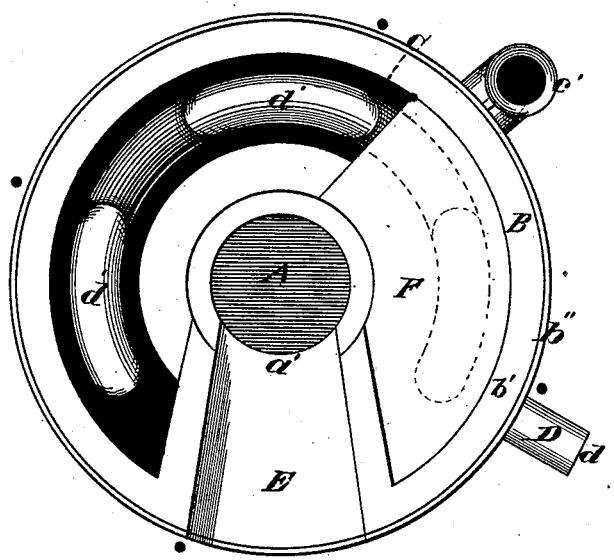
Figure 4:
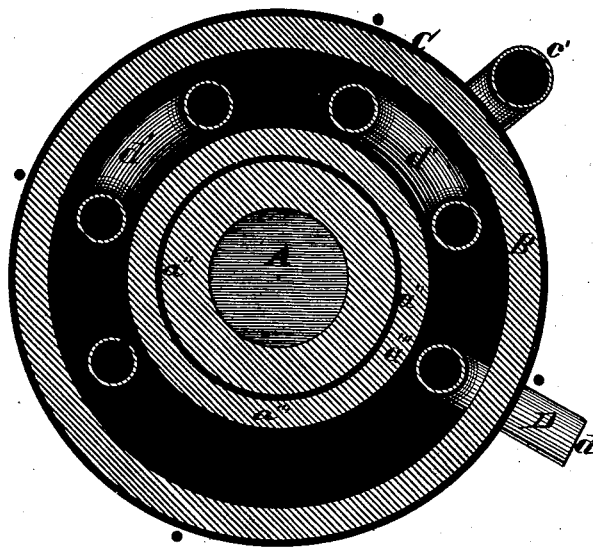
Figure 5:
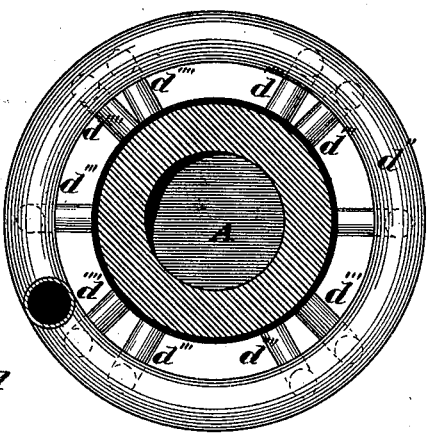

Figure 1 is an elevation, partly in section, of an improved furnace preferably used by me in my process of manufacturing steel and iron; Fig. 2, another elevation, partly in section, of the furnace, taken at right angles to the view presented in Fig. 1; Fig. 3, a horizontal section taken just beneath the top of the furnace; Fig. 4, a horizontal section taken on the line $x\ x$, of Fig. 1; and Fig. 5, a horizontal section taken on the line $y\ y$ of Fig. 1.

The same letters represent the same parts.

The present invention relates to an improved process for readily and cheaply manufacturing a soft, pure, homogeneous iron, in character resembling Norway iron, and a very strong, pure, homogeneous steel, such as crucible-steel, and to the means preferably used in carrying out the process, which is substantially as follows: It consists in melting wrought-iron and cast-iron, combined in suitable proportions with charcoal or other carbonaceous fuel, until the compound—that is, the wrought and cast iron—is very thoroughly melted and brought into the condition of a molten mass. A very hot (preferably as high as 4,000° Fahrenheit) air-current is then passed through all parts of the molten mass, and meanwhile the outer atmosphere is carefully excluded, and suitable chemicals, such as lye, soda-ash, manganese, and salt are introduced into the molten mass. This subjection of the molten mass to the influence of the heated air is continued for, say, fifteen to forty-five minutes, when the metal becomes purified to a remarkable degree, and thus steel (or wrought-iron, as the case may be) of a very superior quality is readily produced.

A desirable apparatus for effecting my object is shown in the annexed drawing.

A represents a furnace, resting on the posts $a\ a$. It is open at the top $a'$ to receive the charge, and to allow the products of combustion to pass off; but instead of allowing the latter to pass directly off into the open air, they are first made to return from the furnace-top $a'$ downward and around the outside of the furnace, thence to escape into an exit flue or flues. For this purpose the furnace proper A is inclosed above and at its sides by a casing, B, that rests upon an annular plate, $c$, that closely surrounds the furnace A, and that in turn is supported by the posts $b\ b$. The casing, in diameter, is large enough to form an annular space. C, around the furnace, and that serves as a flue to carry off the products of combustion from the furnace. An exit-flue, $c'$, leads from the space or flue C, and, preferably, from the lower end thereof, as shown, through which the products of combustion finally escape to the open air. By thus inclosing the principal portion of the furnace, and causing the products of combustion to circulate around it before escaping to the open air, the furnace is not only kept very warm, but the outer air is effectually prevented from entering the furnace and unfavorably affecting the character of the metal being made therein.

To more effectually carry out this part of the design, the furnace proper A, immediately outside the casing $a''$, is walled about with fire-brick $a'''$, that rests upon the plate $c$, and the casing B is composed chiefly of fire-brick $b'$, contained in a shell, $b''$.

D represents a pipe, through which the hot-air blast is introduced into the furnace A. This hot-air blast may be produced in any desirable manner—that is, the air may be heated by some means without and independent of the present construction, and thence conducted to the furnace. I preferably, however, utilize the space C as an oven, and, by causing the pipe D to wind around therein before entering the furnace, take advantage of the heat escaping from the furnace to heat the air, as follows: Entering the space C at $d$, Figs. 1, 3, 4, the pipe is carried up and down and around in the space C, as shown at $d'\ d'$, Figs. 1, 2, 3, 4, until finally it is made (and preferably just beneath the plate $c$) to encircle the furnace at $d''$, Figs. 1, 2, 5. From this last-named portion $d''$ of the pipe a series of, say, six tuyeres, $d''' \ d''' \ d''' \ d''' \ d''' \ d'''$, lead into the furnace at the level shown. Another series of tuyeres, $d'''' \ d'''' \ d'''' \ d''''$, is also employed, leading preferably from the pipe $d''$ into the furnace just above the boshes, as shown.

The operation is as follows: The furnace is charged in the following manner: A mixture of wrought and cast iron, (the proportion of cast-iron being from one-fifth to one-third of the whole, according as wrought iron or steel is to be produced,) together with charcoal (taking about one bushel of charcoal to seventy-five pounds of metal) is put into the furnace through the doorway E, which, saving when the furnace is being charged, is kept closed by the door $e$. The charge—that is, the wrought and cast iron—comes under the influence of the hot-air blast entering through the upper tuyeres $d''' \ d'''$, and is brought into a molten condition. From this level or zone, the bottom of which is opposite the upper tuyeres, it falls or sinks as a molten mass through a lower zone, encountering the hot-air blast entering through the lower tuyeres $d'''' \ d''''$. This last-named blast is supplementary in its character, operating to intensify the heat of the molten bath, and to render it still more fluid. A very thorough separation of the dirt and objectionable ingredients takes place, and by the time the metal reaches the level of the tap-hole $a''''$ it has become very thoroughly purified. While the molten metal is under the influence of the blast, suitable chemicals, such as concentrated lye, soda-ash, manganese, and salt, are introduced into the molten metal, using for making iron about one ounce of each to one hundred pounds of metal, and for making steel a larger quantity of lye (about four ounces) and manganese (about two ounces.)

If desired, a third series of tuyeres, arranged at a still lower level, can be employed; for a principal feature of the improvement is subjecting the metals, after they have come into the condition of a molten mass, to an intensely-hot air-blast.

In practice, the upper tuyeres are from two to three feet above the lower tuyeres, and the latter are eight to twelve inches above the tap-hole.

The casing is valuable, not only in enabling the furnace to be heated to a higher temperature, but also in preventing the furnace from becoming chilled; for in making steel it is important to prevent in any degree the cooling of the metal while within the furnace.

A plate, F, is arranged at the top of the furnace A, between the latter and the casing B, and extending from the doorway $e$ partly around the flue C. It serves to direct the products of combustion properly around the furnace A before escaping into the flue $c'$, and also as a shelf, upon which the iron may be warmed before being put into the furnace.

G G represent doors in the casing B, for cleaning purposes. The tuyeres $d''''$ are furnished with slides $d'''''$, to enable chemicals to be introduced into the furnace through the tuyeres. The chemicals may also be introduced through the upper tuyeres.

I am aware that cast and wrought iron have been melted together in a cupola-furnace, and also that chemicals have been introduced into molten iron.

I claim—

1. The herein-described process of making pure homogeneous iron and steel, which consists in melting wrought-iron and cast-iron with carbonaceous fuel until said metals are thoroughly melted, and then passing through the molten metal highly-heated air, meanwhile excluding the outer atmosphere and introducing chemicals, substantially as described.

2. The combination of the furnace A, casing B, flue C, and pipe D, substantially as described, and for the purpose of keeping the upper portion of the furnace warm and heating the incoming air-blast.

3. The combination of the furnace A, casing B, flue C, pipe D, and tuyeres $d''' \ d''' \ d'''' \ d''''$, substantially as described, and for the purpose of conducting the air-blast into the furnace after it has been heated by the escaping products of combustion.

4. The combination of the furnace A, casing B, flues C and $c'$, and plate F, whereby the products of combustion are directed around the furnace before escaping into the open air, substantially as described.

5. The combination of the furnace A, casing B, flues C and $c'$, and pipe D, whereby the products of combustion from the furnace, after being utilized for warming the upper part of the furnace and the air-blast are allowed to escape, substantially as described.

DAVID THOMAS.

Witnesses:
CHAS. D. MOODY,
THOMAS BEDDON,
PAUL BAKEWELL.